United States Patent
Bower et al.

(10) Patent No.: US 9,916,432 B2
(45) Date of Patent: Mar. 13, 2018

(54) STORING AND RETRIEVING CRYPTOGRAPHIC KEYS FROM BIOMETRIC DATA

(71) Applicant: Nokia Technologies Oy, Espoo (FI)

(72) Inventors: Chris Bower, Ely (GB); Troels Roennow, Cambridge (GB); Andrew Matthews, Cambridge (GB); Joachim Wabnig, Upper Cambourne (GB)

(73) Assignee: Nokia Technologies Oy, Espoo (FI)

( * ) Notice: Subject to any disclaimer, the term of this patent is extended or adjusted under 35 U.S.C. 154(b) by 48 days.

(21) Appl. No.: 14/885,900

(22) Filed: Oct. 16, 2015

(65) Prior Publication Data

US 2017/0109512 A1    Apr. 20, 2017

(51) Int. Cl.
G06F 12/14    (2006.01)
G06F 21/32    (2013.01)
G06F 21/60    (2013.01)

(52) U.S. Cl.
CPC ............ *G06F 21/32* (2013.01); *G06F 21/602* (2013.01)

(58) Field of Classification Search
None
See application file for complete search history.

(56) References Cited

U.S. PATENT DOCUMENTS

| | | | |
|---|---|---|---|
| 5,984,366 A | * | 11/1999 | Priddy ................. G06Q 20/347 235/380 |
| 7,804,956 B2 | | 9/2010 | Chang et al. |
| 7,844,827 B1 | | 11/2010 | Itoi |
| 8,364,972 B1 | | 1/2013 | Itoi |
| 8,904,187 B2 | | 12/2014 | Saito et al. |
| 8,966,277 B2 | | 2/2015 | Rane et al. |
| 8,972,727 B2 | | 3/2015 | Kindarji et al. |
| 2002/0124176 A1 | | 9/2002 | Epstein |
| 2003/0091218 A1 | | 5/2003 | Hamid |

(Continued)

FOREIGN PATENT DOCUMENTS

WO    WO-2014092183 A1    6/2014

OTHER PUBLICATIONS

"Biometric Authentication Using Machine Learning Techniques." Professional Assignment Editing, College, Law, MBA, Med applications | 100% Original | Excellent 24/7 Customer Service | Affordable Prices for Editing Services. N.p., n.d. Web. Feb. 28, 2017. <https://www.rushtermpapers.com/biometric-authentication-using-machine-learning-techniques-2/>.

(Continued)

*Primary Examiner* — Brandon Hoffman
(74) *Attorney, Agent, or Firm* — Mintz Levin Cohn Ferris Glovsky and Popeo, P.C.

(57) ABSTRACT

Methods and apparatus, including computer program products, are provided securing information. In some example embodiments, there is provided a method, which may include receiving, at a user equipment, biometric data from a user of the user equipment; receiving, at the user equipment, sensitive data to be encoded and/or decoded; encoding, based on at least one feature detected in the biometric data, the sensitive data, when the user equipment is in a storage mode; and decoding, based on at least the at least one feature detected in the biometric data, the sensitive data, when the user equipment is in a read mode. Related apparatus, systems, methods, and articles are also described.

19 Claims, 14 Drawing Sheets

(56) References Cited

U.S. PATENT DOCUMENTS

| | | |
|---|---|---|
| 2003/0116630 A1 | 6/2003 | Carey et al. |
| 2003/0219121 A1 | 11/2003 | van Someren |
| 2006/0082439 A1* | 4/2006 | Bazakos ............ G06K 9/00228 340/5.82 |
| 2007/0078780 A1* | 4/2007 | Tran ........................ G06F 21/32 705/65 |
| 2008/0072063 A1 | 3/2008 | Takahashi et al. |
| 2008/0209226 A1 | 8/2008 | Venkatesan et al. |
| 2008/0222496 A1 | 9/2008 | Tuyls et al. |
| 2010/0228692 A1 | 9/2010 | Guralnik et al. |
| 2012/0303966 A1 | 11/2012 | Hubner |
| 2012/0317024 A1 | 12/2012 | Rahman et al. |
| 2013/0004033 A1 | 1/2013 | Trugenberger et al. |
| 2013/0147603 A1 | 6/2013 | Malhas et al. |
| 2014/0143551 A1 | 5/2014 | Rothschild |
| 2014/0196131 A1 | 7/2014 | Lee |
| 2015/0028996 A1 | 1/2015 | Agrafioti et al. |
| 2015/0035643 A1 | 2/2015 | Kursun |
| 2015/0186721 A1 | 7/2015 | Derakhshani et al. |

OTHER PUBLICATIONS

Korte, Ulrike, and Rainer Plaga. "Cryptographic protection of biometric templates: Chance, challenges and applications." BIOSIG 108 (2007): 33-46.

Rajput, Minakshi R., and L. M. Waghmare. "Iris feature extraction and recognition based on different transforms." International Journal of Advance in Science Engineering and Technology 1.1 (2013): 37-41.

Uludag, Umut, and Anil Jain. "Securing fingerprint template: Fuzzy vault with helper data." Computer Vision and Pattern Recognition Workshop, 2006. CVPRW'06. Conference on. IEEE, 2006.

Violino, Bob. "Biometric security is on the rise." CSO Online. CSO, Mar. 3, 2015. Web. <http://www.csoonline.com/article/2891475/identity-access/biometric-security-is-on-the-rise.html>.

* cited by examiner

STORING AND RETRIEVING CRYPTOGRAPHIC KEYS FROM BIOMETRIC DATA

FIELD

The subject matter disclosed herein relates to authentication using biometric information.

BACKGROUND

User equipment including smart phones, portable and wearable electronic devices, access control devices, and/or other type of processor-based device may be used to monitor or detect the biometric parameters of a user. Moreover, these biometric parameters may be relatively unique, and, as such can be used to authenticate the user. For example, a user's fingerprint, voice, retina, capillaries, face, and/or the like may be detected and then used to authenticate, before authorizing payment or granting access to the device, a user of a cell phone, smart phone, or other device containing secure information.

SUMMARY

Methods and apparatus, including computer program products, are provided securing information.

In some example embodiments, there is provided a method, which may include receiving, at a user equipment, biometric data from a user of the user equipment; receiving, at the user equipment, sensitive data to be encoded and/or decoded; encoding, based on at least one feature detected in the biometric data, the sensitive data, when the user equipment is in a storage mode; and decoding, based on at least the at least one feature detected in the biometric data, the sensitive data, when the user equipment is in a read mode.

In some example embodiments, one of more variations may be made as well as described in the detailed description below and/or as described in the following features. The encoding may further include encoding the sensitive data based on a position of the at least one feature. The encoding may further include mapping a portion of the sensitive data to the position of the at least one feature in the biometric data and storing, as an encoded representation of the portion of the sensitive data, the position of the at least one feature and a location of the portion in the sensitive data. A repetitive error correction code may be applied to at least the other position before the storing. The encoding may further include mapping another portion of the sensitive data to another position of another feature in the biometric data and storing, as an encoded representation of the other portion of the sensitive data, the other position of the other feature and another location of the other portion in the sensitive data. The storing may include storing in secure storage. The at least one feature may be selected from among a plurality of features detected from the biometric data. The at least one feature may be selected at random from among the plurality of features. The biometric data may be measured by at least one of an optical coherence tomography sensor, an optical sensor array, an infrared sensor array, a flexible optical sensor array, a retinal scanner, a fingerprint scanner, a vein scanner, a camera providing facial images, and/or a microphone providing a voice pattern. The method may further include identifying at least one feature from the received biometric data. The received biometric data may be pre-processed by at least finding a reference landmark in the received biometric data to enable an alignment of the received biometric data. The sensitive data may undergo an exclusive OR operation with a unique device string prior to the encoding. The sensitive data may undergo error correction coding prior to the encoding. The decoding may further include decoding the stored position of the at least one feature into the sensitive data. The decoding may further include retrieving, from storage, the position of the at least one feature, mapping the position to a portion of the sensitive data; and providing the sensitive data as a decoded output. The storage may include secure storage. A repetitive error correction code may be applied to the decoded output. The decoded output may undergo an exclusive OR operation with a unique device string. The decoded output may undergo error correction. The biometric data may be combined with other biometric data and/or physiological data obtained from the user to further authenticate the user.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

Figure 1A:
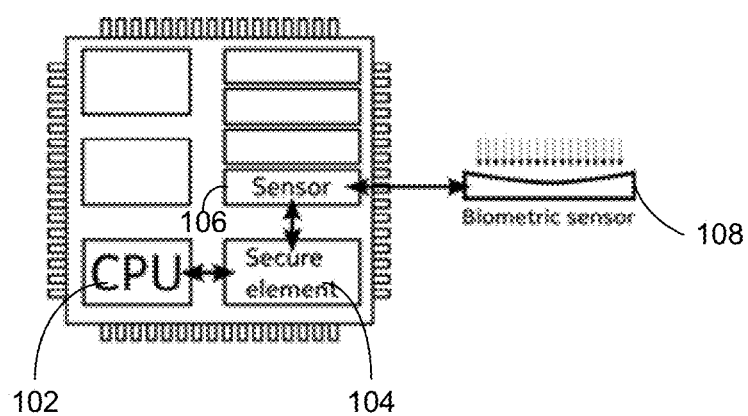
FIG. 1A depicts an example of a system-on-chip including a secure element, in accordance with some example embodiments.

Like labels are used to refer to same or similar items in the drawings.

DETAILED DESCRIPTION

User equipment may store sensitive data, such as credit card information and authentication data, on the user equipment itself or at a centralized server. But if the user equipment (or server) is compromised both the credit card information and the user authentication information, such as a user's biometric data, may be compromised, allowing an unauthorized user to perform transactions using the stolen sensitive information.

In some example embodiments, biometric data may be used to form a codebook or dictionary for encoding or decoding information, such as sensitive data, that can be stored at, and/or retrieved from, a user equipment. In some example embodiments, the features in the biometric data may be used as the code book. In some example embodiments, the positions of features within the biometric data may be used as the codebook.

In some example embodiments, the sensitive data may be stored and retrieved from a secure element included in, or coupled to, the user equipment.

In some example embodiments, a string unique to the device (a unique device string) may be used during the encoding and/or decoding process. This unique data string may be used to somewhat randomize the sensitive data prior to encoding. Moreover, the sensitive data may, in some example embodiments, be error correction coded prior to encoding.

In some example embodiments, certain types of sensors may be used to capture the biometric data, and these certain types of sensors may generate biometric data that is relatively difficult to duplicate, without appropriate sensors. In some example embodiments, the sensor may comprise an optical coherence tomography (OCT) sensor that can identify vein patterns of the finger, although other types of sensors may be used as well. In some example embodiments, optical sensor arrays may be used to identify vein patterns, and/or may also provide real-time measurements of heart rate, heart rate variability, blood flow, blood pressure, and/or any other biometrics. The real-time measurement(s) may also be used to authenticate that the subject is actually the subject (for example, alive and/or the actual subject of the biometrics) to for example foil attempts to use for example biometrics from body parts of a dead subject or a body part that has been removed from a subject (for example, a non-cooperative subject whose finger is removed). The measurements may also be used to complement the biometric data by providing additional wellness functions or additional security measures based upon a combination of heart rate signature, blood pressure and heart rate variability. The optical sensor array may be an infrared (IR) sensor having a high dynamic range to allow for more detailed image capture, and be based upon graphene field effect transistors functionalized with quantum dots. The optical sensing array may be fabricated upon a flexible substrate to allow for better optical coupling with the part of the body that has the biometric data of interest. In some example embodiments, the sensor may be directly attached to the skin.

In some example embodiments, biometric data may, as noted, be used as a codebook or dictionary to encode and/or decode information, such as sensitive data for, storage and retrieval. For example, a user's measured biometric data may include one or more features. The sensitive data to be encoded may be coded based on the biometric features (or based on the position of those features in the biometric data). Moreover, a unique device string may be used to randomize the sensitive data prior to the encoding. Examples of sensitive data may include a private key used for identity authentication, a password, credit card information, a bitcoin wallet, an encryption key for storage of certain data, an encryption key for permission to view sensitive information, and/or any other private or sensitive information sought to be protected.

FIG. 1A depicts an example system-on-chip (SOC) 100 implementation, in accordance with some example embodiments. The apparatus 100 may include a central processing unit (CPU) 102, which may be coupled to a secure element 104. The secure element 104 may be further coupled to a sensor interface 106, which may interface one or more biometric sensors 108. The sensor interface 106 may provide (pre-) processing, such as alignment, (re-) scaling, normalization, color normalization, and/or the like.

The secure element 104 may comprise a tamper-resistant platform (for example, a secure microcontroller including memory) that can securely host applications, store sensitive data, keys, and/or the like. For example, apparatus 100 may include secure element 104, which may take the form of a so-called secure smart card (for example, EMV smart card and the like), although the secure element 104 may take other forms as well including for example a processor circuitry, ASIC, FPGA, SoC, and/or any other type of device.

The biometric sensor 108 may generate biometric data by detecting (for example, measuring, deriving and/or the like) characteristics of the user's body. An example of a biometric sensor 108 that may be used, in accordance with some example embodiments, is an optical coherence tomography (OCT) sensor, although, as noted, other types of sensors may be used as well. Other types of biometric sensors include retinal scanners, fingerprint, infra-red or visible wavelength vein scanners, facial pattern recognition, voice patterns, and/or the like. Moreover, a single or a plurality of biometric sensors may be used as well to obtain biometric data for a given user. The biometric sensor(s) may be physically located together with the secure element 104 or physically located on a separate device that is independent from the secure element 104. When sensor element 108 is separated physically from the secure element 104, the sensor interface 106 may be co-located with either the secure element 104 or the sensor 108. Communication between the secure element 104 and the sensor 108 may be provided through wired or wireless connections.

In the case of biometric sensor 108 implemented as an OCT sensor, the OCT sensor 108 may provide biometric sensor data that may be characterized as having a high amount of entropy. Moreover, this biometric data (generated by OCT sensor 108) may be relatively difficult to duplicate (since the OCT measures aspects below the skin surface, which may not be visible to the naked eye).

The secure element 104 may be configured to at least store data such as sensitive data (which is described further below with respect to FIG. 2) and/or read the stored data (which is described further below with respect to FIGS. 3 and 9 below). As noted above, a user's biometric data may be used as a dictionary that encodes sensitive data stored in the secure element 104, in accordance with some example embodiments. When the user seeks access to the encoded sensitive data (which is encoded using the biometric feature based dictionary or codebook) at the secure element 104, the user's biometric data may be used as a dictionary or codebook to then decode the encoded sensitive data, in accordance with some example embodiments. In this way, a user's biometric data may be stored in an encoded manner providing some security to the biometric data.

The secure element 104 may be further configured to include additional components, such as one or more cryptographic units, one or more payment processors, and/or the like. These additional components may vary based on the specific application being supported by the secure element 104. For example, when the secure element 104 is embedded into a credit card or a bitcoin wallet, the secure element may include a payment processor corresponding to the type of payment the card/wallet supplies. To illustrate further, in the case of authentication, corresponding protocols for generating one-time passwords or establishing proof-of-identity through cryptographic proof may be included in the secure element 104.

Figure 2:
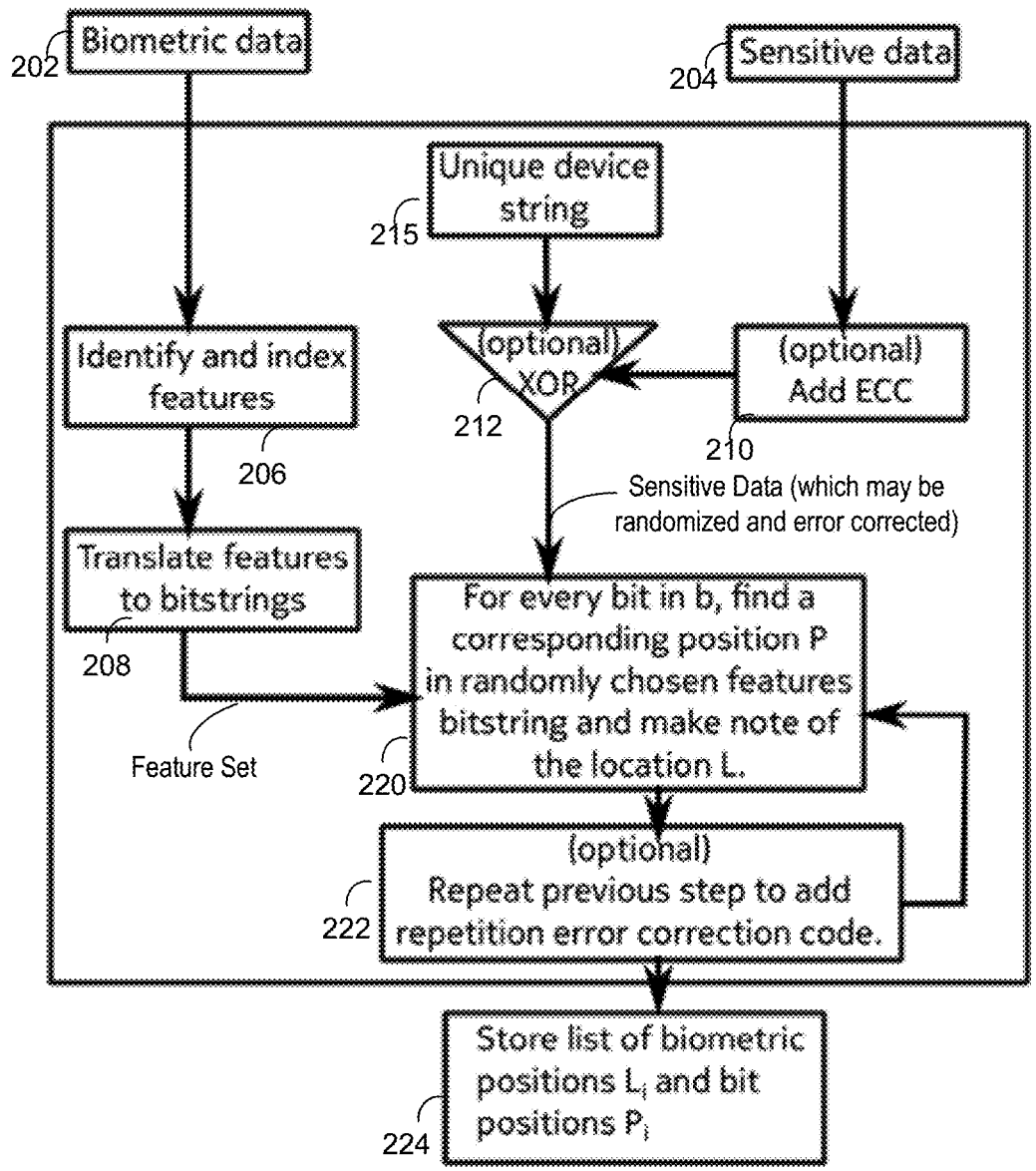
FIG. 2 depicts an example of storing, in accordance with some example embodiments.

FIG. 2 depicts a process 200 for storing by the secure element 104 (labeled "storage unit" to indicate a storage mode of the secure element), in accordance with some example embodiments. The description of FIG. 2 also refers to FIG. 1A. The secure element may, in some example embodiments, be coupled to, or included in, a user equipment. For example, the user equipment including the secure element may be in a storage mode, in which case sensitive data may be encoded and stored to the secure element.

At 202, biometric data may be received by the secure element 104, in accordance with some example embodiments. For example, biometric sensor 108 may generate biometric data, such as OCT sensor data of the user's finger, although other types of biometric sensors may be used as well. At 202, this generated biometric data may be sent to, or received at, secure element 104.

At 206, the received biometric data may be pre-processed, in accordance with some example embodiments. The pre-processing may also include orienting or aligning the received biometric data, and then detecting certain features in the biometric data. Features in the biometric data may be measured, detected, or derived from the biometric data. In the case of an OCT of a finger for example, the features may include certain vein patterns detected (or derived from) in the biometric data image of the finger. Alternatively or additionally, the feature detection may include determining one or more metrics, such as an average value of the saturation (or intensity in a selected region of the biometric data). Other features may be identified as well, examples of which include determining an average value of any measurable quantity in the biometric data (whether constant or varying during the period of biometric sensor 108 measurement). Moreover, the types of detected features may be pre-determined, although the features may be generated or learned, for a given user, over time as well.

The processing at 206 may also include orienting or aligning the biometric image. For example, a reference landmark feature may be used to orient the biometric data so that processing is performed with an aligned biometric dataset. Alternatively or additionally, the pre-processing may include splitting of a vein into two or more veins.

At 208, the biometric data features may be translated into a string, such as a bit string (for example, a bit sequence or vector of data), in accordance with some example embodiments. For example, when the feature(s) for the biometric data are identified, each distinct type of feature may be associated with a word comprising a pre-defined number of bits. FIG. 9 (described further below) depicts an example of translating features into bit strings.

At 204, sensitive data may be received by the secure element 104, in accordance with some example embodiments. For example, a mobile payment application may, at 204, provide sensitive data to the secure element 104. This sensitive data may include a private key for example, and this key may be used for identity authentication, although the sensitive data may take other forms as well.

A 210, the sensitive data 204 may be error correction coded (ECC), in accordance with some example embodiments. For example, the sensitive data may be error correction coded by applying Reed-Solomon coding, although other types of error correction and/or detection coding may be used as well.

At 212, the received sensitive data 204 may be combined (for example, via an XOR operation) with a unique device string 215, in accordance with some example embodiments. For example, the unique device string may be an identifier that is unique to the user equipment including the secure element 104. Examples of the unique device string include a media access control (MAC) address, an international mobile station equipment identity (IMEI), a secure identifier, a non-publically addressable identifier, and/or any other type of identifier including any other type of identifier that is unique to the user equipment, user, and/or the secure element 104). The combining performed at 212 may randomize the sensitive data, and, as such, may provide a relatively higher level of security.

At 220, the resulting string output by the XOR 212 (which represents the "sensitive data") may be encoded based on the position(s) of selected feature(s) in the biometric data. For example, the biometric data may include a set of features, and each of these features may have positions within the biometric data. In this example, the sensitive data (which is output by the XOR 212) may be encoded as one or more positions (as position vectors, for example) in the biometric feature set. In this way, the encoding is unique to the biometric data, and the information is stored as position(s) or position vectors, rather than actual biometric data. In some example embodiments, for each bit (or bits) in the sensitive data (which may be output by the XOR 212) a feature (which has a position within the biometric data) is selected from in the feature sets, such as the features bit string generated at 208). This selection of features (and thus positions) may be random, although the feature selection may be predetermined as well. The resulting list of feature positions (and the corresponding location of the bit(s) in the sensitive data) may thus encode the original sensitive data 204 (which may be error correction coded and randomized at 210 and 212 as well). FIG. 9 described further below describes an example implementation that is similar to the encoding performed at 220.

In some example embodiments, the output of 220 may be further error correction coded, in accordance with some example embodiments. For example, the output may be error correction with a repetition code at 222, in which the output is repeated at least once, although other forms of error correction coding may be used as well. Next, the biometric data locations, $L_i$, and bit positions, $P_i$, may be stored, at 224, in accordance with some example embodiments. For example, biometric data locations, $L_i$, and bit positions, $P_i$, may be stored at the secure element 104, or another storage device coupled to, or included in, the secure element.

Figure 3:
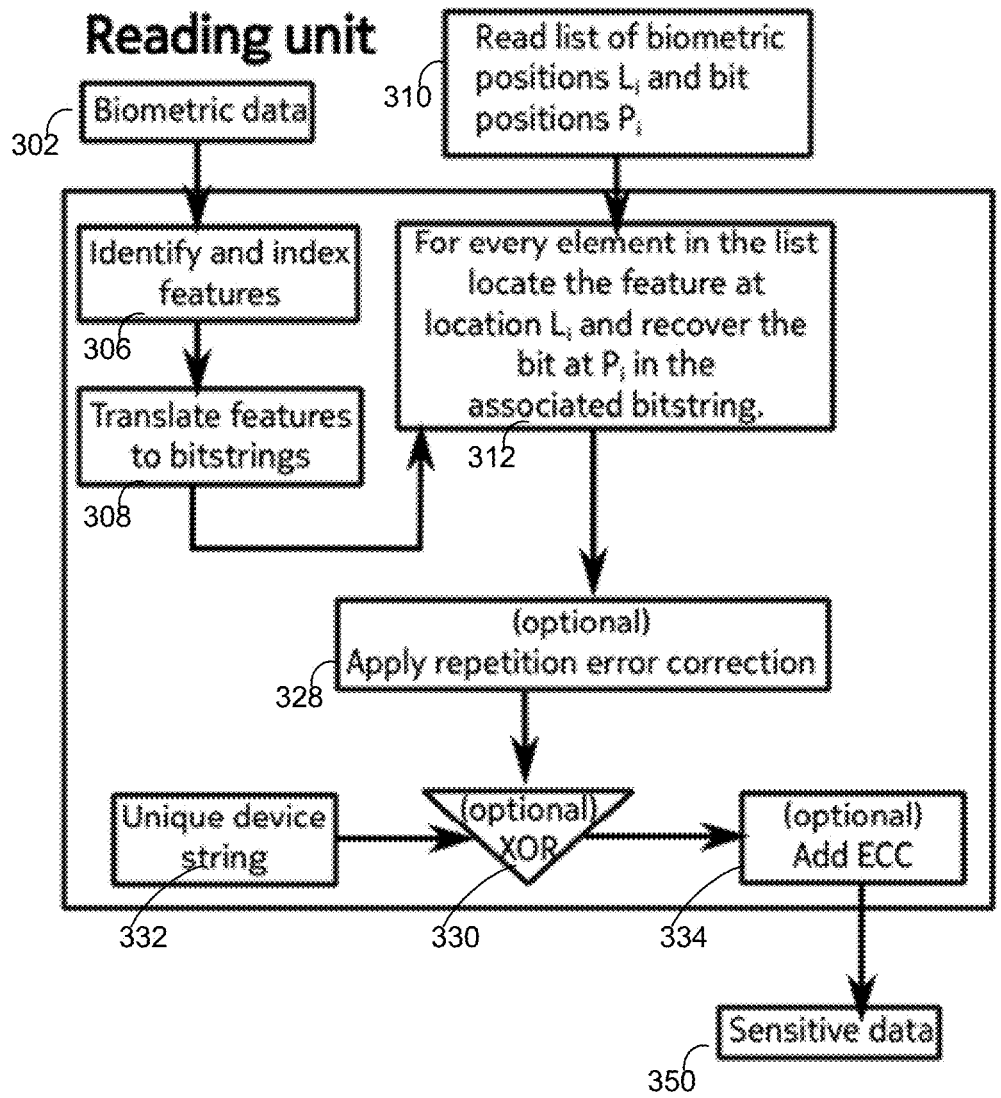
FIG. 3 depicts an example of retrieving, in accordance with some example embodiments.

After the sensitive data has been stored at the secure element 104 in accordance with process 200 for example, the sensitive data may be decoded and thus read/retrieved as described further with respect to FIG. 3. Although some of the examples refer to storage in secure element 104, the storage and retrieval may include other types of storage including less secure storage.

FIG. 3 depicts a process 300 for reading or retrieving by the secure element 104 (labeled "reading unit" to indicate a reading mode of the secure element), in accordance with some example embodiments. The description of FIG. 3 also refers to FIG. 1A. The secure element may as noted be coupled to, or included in, a user equipment. For example, the user equipment including the secure element may want to read the previously stored sensitive data. When the user equipment is in this read mode, the user equipment may thus seek to decode the stored information to obtain the sensitive data.

At 302, biometric data may be received by the secure element 104, in accordance with some example embodiments. For example, the user's biometric data may be measured as described above with respect to 206 (FIG. 2), but at process 300 the received biometric data 302 is being used to retrieve the sensitive data encoded and stored during process 200.

At 306, the received biometric data may be pre-processed to identify features, in accordance with some example embodiments. This aspect may include the same or similar pre-processing/feature identification as described above with respect to 206 (FIG. 2). At 308, the biometric data features may be translated into a bit string, in accordance with some example embodiments. This aspect may include the same or similar pre-processing as described above with respect to 208 (FIG. 2). At 310, the list of biometric feature locations ($L_i$) and bit positions ($P_i$) may be known or otherwise received/obtained from storage, for example.

At 312, for every feature location, if a feature is present, the bit position is located in the corresponding bit string, and that bit is added to the decoded string of sensitive data. If the feature is not found, a "don't-know" value may be added to the decoded string. Once the last bit is added, the output of 312 may be further processed. For example, if a repetition error correction code was applied at 222, a corresponding inverse repetition error correction code is applied at 328. At 330, an exclusive OR (XOR) operation may be performed between the unique device string 332 (if the unique device string was used at 215) and the output of 312/328. At 334, additional error correction may be applied if the error correction was applied at 210. At 350, the original string (which represents the sensitive data 204 stored during process 200) may be decoded and provided as an output.

As the biometric data, or signature, may only have a finite amount of entropy, there may be a relative limit to how much sensitive data can be stored before the encryption (or coding) scheme disclosed herein at 200/300 may be considered weak. As such, the encryption scheme disclosed herein may also be used to store a randomly generated password that may be combined with the encryption scheme disclosed herein at 200/300.

Figure 1B:
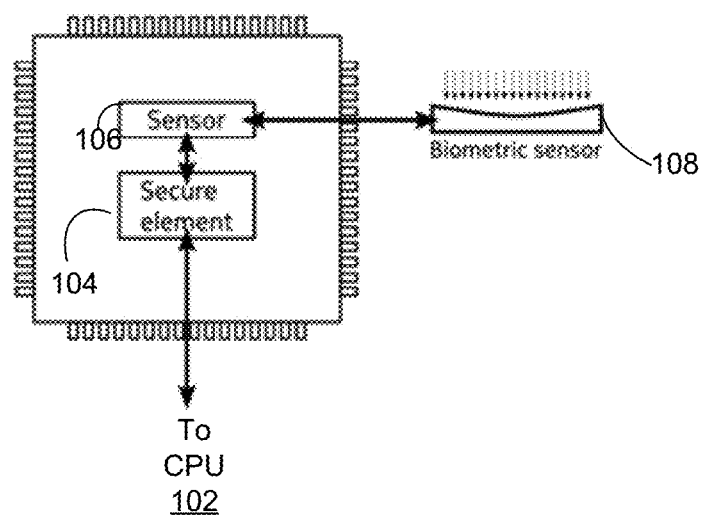
FIG. 1B depicts an example of an integrated circuit including a secure element, in accordance with some example embodiments.

Although some of the examples refer to a SoC implementation, other types of implementations may, as noted, be realized as well including a discrete integrated circuit (IC) implementation as shown in FIG. 1B, in accordance with some example embodiments. Moreover, although the some of the example embodiments are described in the context of a specific SoC or IC implementations, other implementations may be used as well. For example, processor circuitry including memory containing program code may be configured to perform one or more aspects of process 200 and/or 300.

Figure 4:
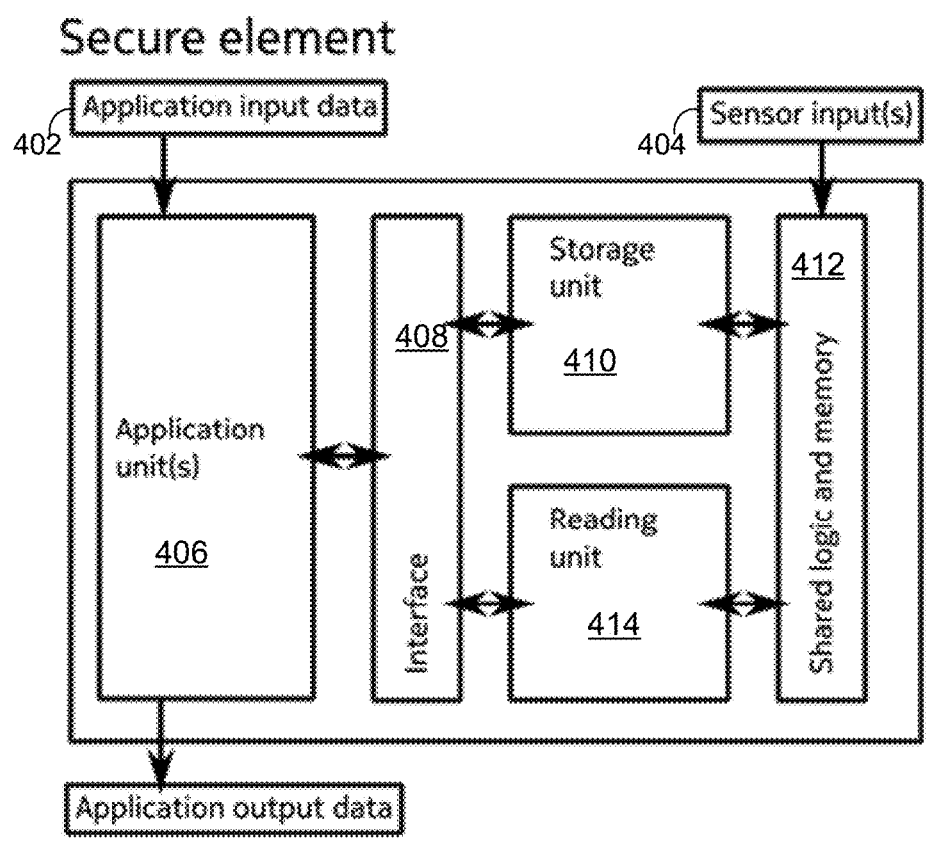
FIG. 4 depicts an example of a secure element, in accordance with some example embodiments.

FIG. 4 depicts an example implementation of the secure element 104, in accordance with some example embodiments. The secure element 104 may include inputs 402 where sensitive data may be provided by an application, and may include input 404 where biometric sensor data 202 may be provided by sensor 108 for example. The secure element 104 circuitry may include at least one processor circuitry (labeled application units(s) 406) that interfaces 408 to at least the storage unit 410, a shared logic and memory unit 412, and a reading unit 414. The storage unit 410 may write the sensitive data 204 in an encoded form to storage, in accordance with some example embodiments.

Off/On-Line Wearable Authentication Use Case Example

In some example embodiments, a user equipment may comprise a wearable device, such as a smart watch, a body sensor, a smartphone, and/or any other wearable device. The wearable device may provide secure user authentication based on biometric data, in accordance with some example embodiments. Moreover, this authentication may be configured to proceed without a password or PIN input by the user. For example, a user may be proximate to, or contacting, a sensor that wirelessly triggers a mobile payment transaction (and/or may for example, allow authenticated access to secured data, equipment or areas) using the sensitive data stored and retrieved in accordance with processes 200 and/or 300. In some example embodiments, this authentication may be triggered automatically (for example, by proximity between the wearable biometric device and another sensor, such as an NFC sensor).

Figure 5A:
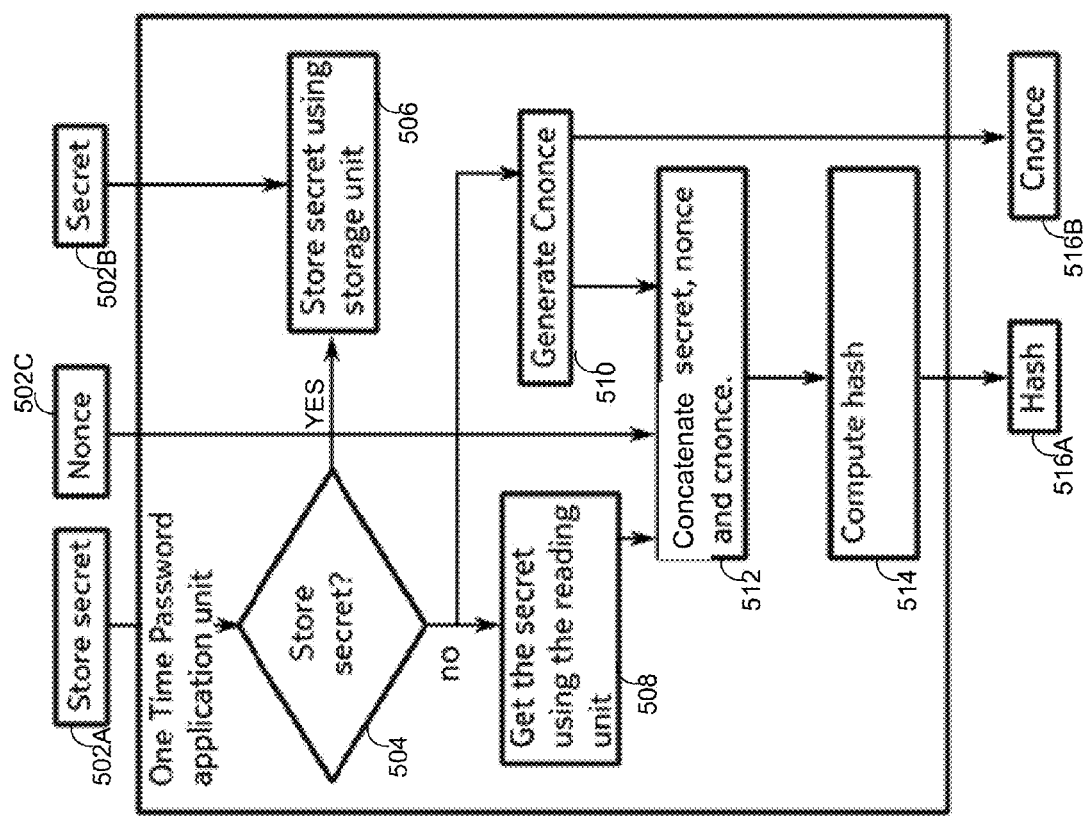
FIG. 5A depicts an example of a process for a one-time password, in accordance with some example embodiments.

FIG. 5A depicts an example process for mobile payments, authorized access, and authentication, in accordance with some example embodiments. The description of FIG. 5A also refers to FIG. 4. In the example of FIG. 5A, a user equipment may be proximate to, or make contact with, a sensor, such as an NFC sensor, to trigger a transaction, such as a mobile payment transaction for a purchase of a good or service or access to secure data, equipment, or locations. The sensitive data processes 200/300 disclosed herein may be used, in accordance with some example embodiments, to authenticate the user and thus provide a higher degree of relative security/confidence with respect to these so-called "contact-less" mobile transactions.

In some example embodiments, application unit 406 may generate a one-time password for authentication. This authentication may be used to for example readily authenticate a user equipment, such as a wearable device, in a way that does not require a user to repeatedly provide a password or PIN. In this example, a challenge-response process is described at FIG. 5A, although other schemes such as zero-knowledge password proof, time-synchronized one-time passwords, and/or the like may be used as well.

For example, the one-time password may be received at 502B along with an indication 502A that the secret 502B may be stored 506 at storage unit 410 (yes at 504) in accordance with process 200 for example, to enable later use. However, if the indication 502A is not to store but retrieve, the secret may be retrieved/read at 508 from the storage unit 410. When this is the case, the retrieved secret, a nonce 502C, and a generated client nonce (Cnonce) may be concatenated at 512. At 514, a hash may be generated of the concatenated output of 512. The generated hash output from 514 and the generated Cnonce may be provided as output 516A-B to authenticate the transaction. In this example, authentication may unlock doors for example of an automobile or home, or be used to sign the user into on- and offline services, without revealing the users biometric signature, nor by compromising security.

Biometric Bitcoin Wallet Use Case Example

Figure 5B:
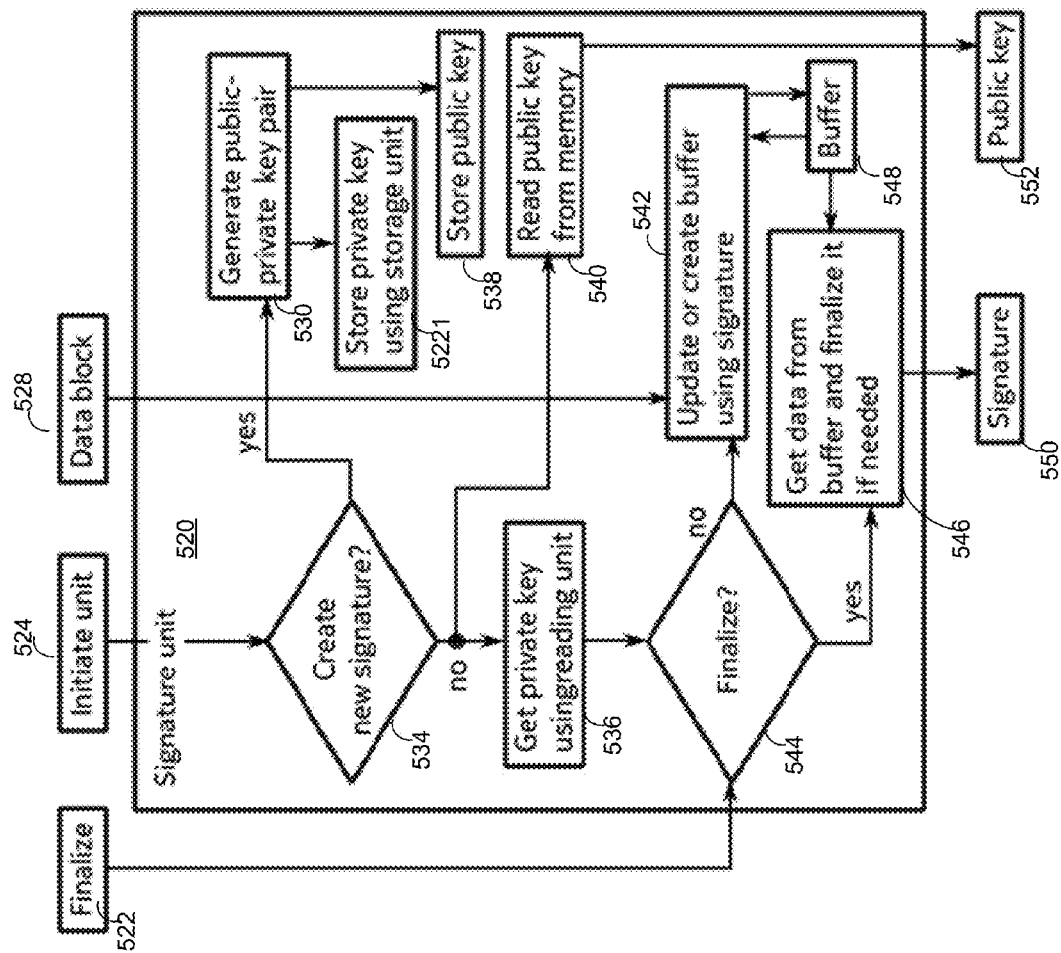
FIG. 5B depicts an example of a process for signing transactions, in accordance with some example embodiments.

In some example embodiments, cryptographic signatures may be used to authenticate a specific action. For example, elliptic curve proofs may be used for authenticating transactions in for example a payment transaction, such as a Bitcoin transaction (although other types of transaction protocols may be supported as well). FIG. 5B depicts an example of a so-called wallet. In the example of FIG. 5B, a signature unit 520 may provide the wallet for the transactions, although the signature unit 520 may be used to perform other types of authentication as well.

In some example embodiments, the secure element depicted at FIG. 4 may be implemented to provide a signature unit 520, in which case it may be initiated by a signal 524 that activates a key generation 530 and stores the private and public keys at 522 and 538. The private key may be securely accessed using a read at 536 (via for example read unit 414) and using a write at 522 (via for example storage unit 410). The read and write mechanisms associated with public key storage at 538 may be implemented as regular memory, such as flash memory, EEPROM, distributed RAM, and/or the like, rather than secure storage. The memory used at 538 may be accessible as an output signal at 552 upon activation of unit, which reads the public key from memory at 540. In this example, data blocks may be provided to the circuit through a signal at 528, and a buffer 548 may updated by an algorithm or circuit which updates the create buffer using the signature 542. Upon receiving a finalization signal 5221, the buffer 548 may be copied to 546 where post processing may take place, and the memory 548 may be cleared such that the signature unit 520 may be ready to sign the next data. The signature may be provided by 546 through the signal 550.

Biometric Mass-Storage Use Case Example

Figure 5C:
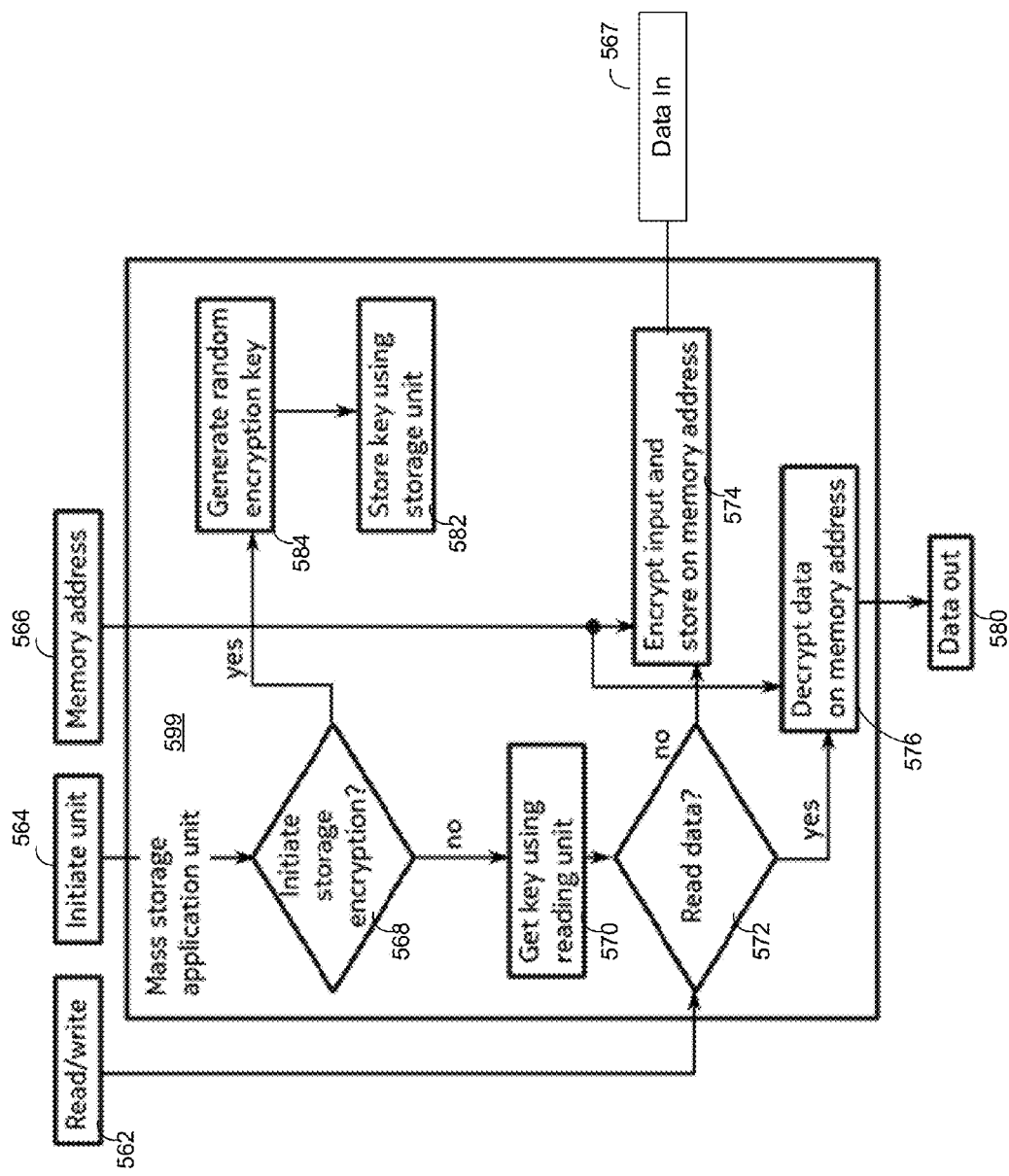
FIG. 5C depicts an example of a process for mass storage, in accordance with some example embodiments.

FIG. 5C depicts an example process for providing by an apparatus 599 (labeled mass storage application unit) a secure, biometrically activated, mass storage device by at least using the read 414 and write units 410 (of FIG. 4) in combination with a random number generator to encrypt the storage. Referring to FIGS. 5C and 4, the mass storage device may be initiated by activating a signal at initiating unit 564 upon which a cryptographic key may be generated at 584 and stored at 582 using a storage unit storage unit 410. Upon normal operation (no at 568), the encryption key may be fetched at 570 through 414. In the case of writing (no at 572), a data input 567 may be encrypted using the key 570, and then stored in memory 576 on the address "memory address" 566. In the case of reading (yes at 572), the key from 570 may be used to decrypt 576 the contents in memory located at the signal "memory address" 566. Alternatively or additionally, an external interface may be coupled to storage unit 410, such that the storage itself may be located outside of the secure element 104, while encryption and decryption of the data may be performed within the secure element 104. When this is the case, the device may be used for example as a component to store passwords for user's online accounts, store sensitive documents, and/or the like.

Smartcard Chip with Biometric Storage Use Case Example

In some example embodiments, the subject matter disclosed herein may be used to provide authentication of transactions on for example credit cards, debit cards, including chip based technology such as so-called smart cards. When this is the case, application unit 406 may be implemented as disclosed herein or may be a tailored application unit. However, in this example use case, the sensor may be provided by a third party, such as a shop or merchant, and the obtained biometric data may be sent to the chip 100 (which may be on the credit card and inserted into an appropriate card slot/reader or connecting unit). Upon receiving the sensor data (which may comprise OCT data although other types of biometric data may be used as well) and a desired transaction, the chip may respond with an appropriate authenticating string. To illustrate further, the following provides an illustrative example.

The following example may define the sensitive data as an 88-bit message including HELLO WORLD for purposes of illustration, although other types of sensitive data may be used as well. Moreover, the following example may define a feature as a block within a region defined by alignment patterns (which are stored on the user equipment including the secure element). These alignment patterns may be used to determine where to perform a read.

Figure 6:
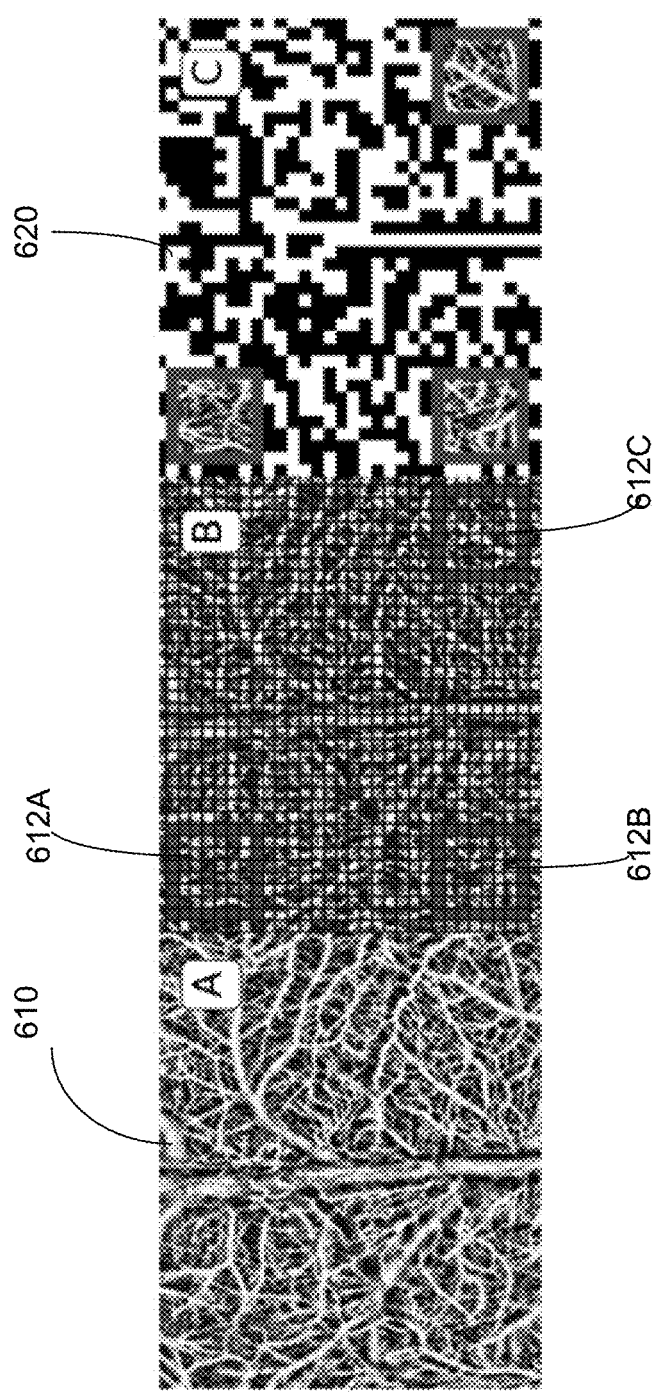
FIG. 6 depicts an example of biometric data 610, in accordance with some example embodiments.

FIG. 6 depicts an example of biometric data 610, in accordance with some example embodiments. The description of FIG. 6 also refers to FIGS. 3 and 1A.

When the biometric data 610 is received at 302, the appropriate alignment patterns (which as noted serve as features) may be located as described above with respect to 306. In the FIG. 6 example, the three corners 612A-C are formed into a grid consisting of 35 sub-regions along x and y that yields a total of 1225 cells. At 308, each of the cells may be translated into a bit string of one bit using a bit generator, f, as a function that is applied to each cell. In this example, the function, f, compares the mean value of the contents of the cell to the mean value of the entire biometric data sample, although other functions and metrics may be used as well. And, a value of 1 is generated when the mean value is above and otherwise 0. The result is shown at 620. The alignment data may be stored at the apparatus 100, and this alignment data may be used to detect if the sensor is misaligned. If carefully chosen, the alignment points may be used to correct for incorrect alignment and the apparatus 100 may still function. In this way, the biometric data from a biometric sensor may be processed to detect alignment and/or make adjustments to provide alignment.

Figure 7:
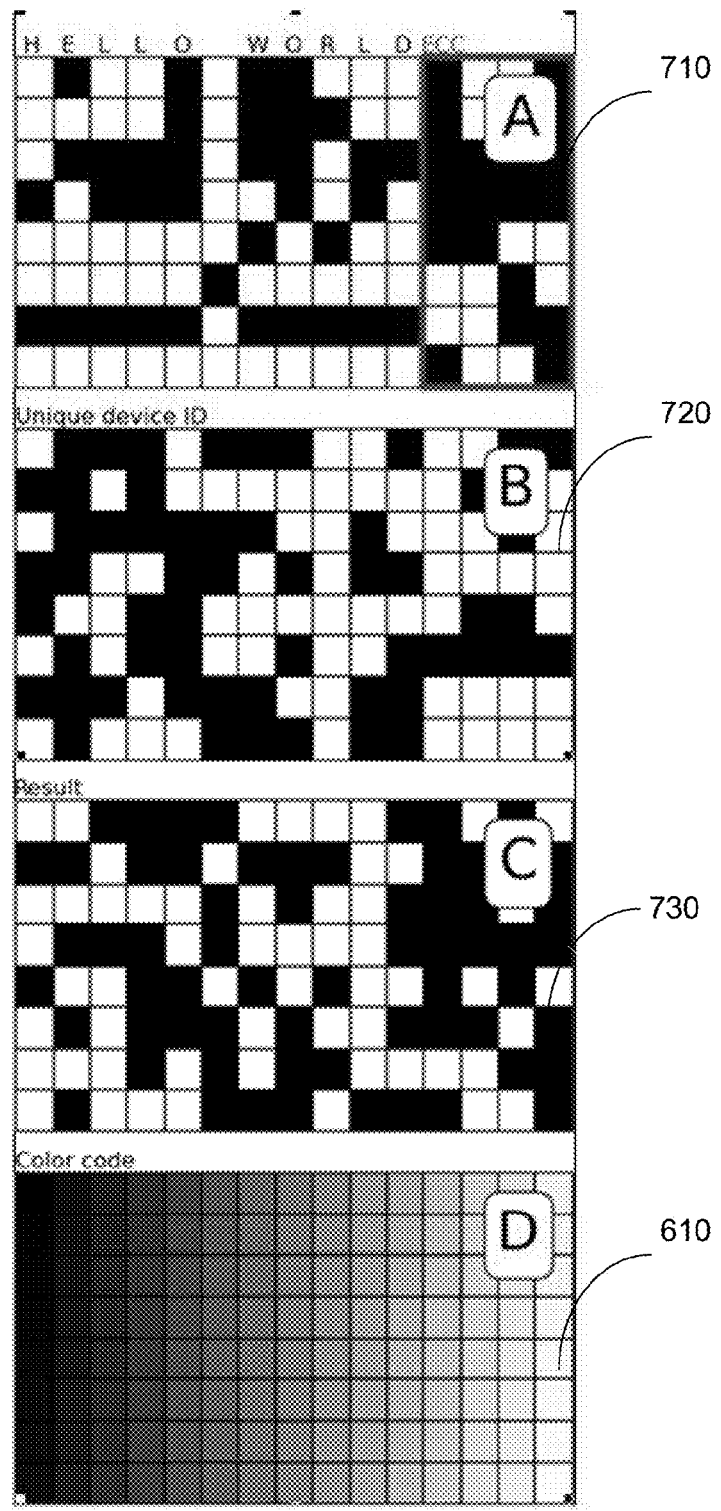
FIG. 7 depicts an example use of 4-bit Reed-Solomon error correction, in accordance with some example embodiments.

FIG. 7 depicts an example in which 4-bit Reed-Solomon error correction is applied at 334 for example to provide detection and correction errors. The description of FIG. 7 also refers to FIGS. 3 and 1A. In the FIG. 7 example, the string "HELLO WORLD" may be encoded into a bit string representation and then error correcting coding is applied as shown at 710. The result may be XOR'ed as described above with respect to 330 with a unique device ID, an example of which is shown at 720. The output of the XOR is shown at 730. This output 730 may represent the sensitive data encoded so that it is relatively random. At 740, each bit position of the output string may depicted by a greyscale value.

Figure 8:
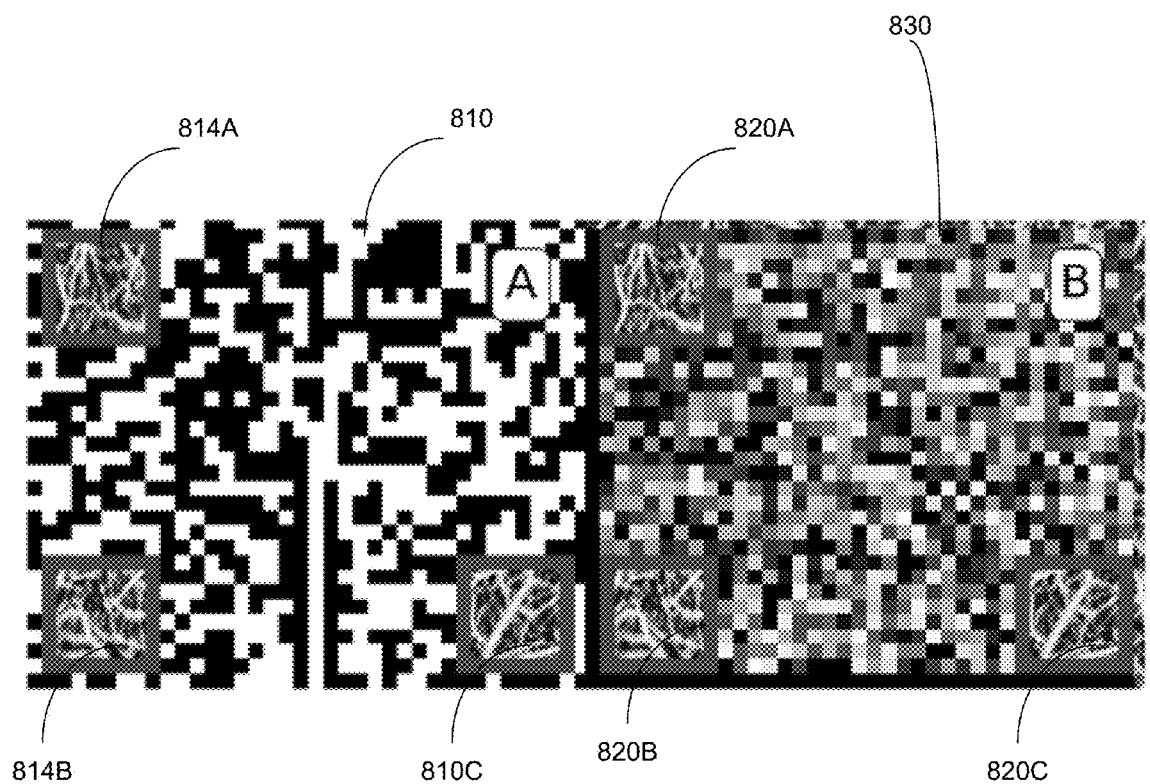
FIG. 8 depicts an example of storing biometric data in a dataset, in accordance with some example embodiments.

FIG. 8 depicts an example showing how a dataset may be stored, in accordance with some example embodiments. The description of FIG. 8 also refers to FIG. 3 at 220.

Biometric data translated into a bit string (as shown at 814A-B) as described above at 208 may be stored in the random bit pattern generated as an output of 212. FIG. 8 at 810 shows this random bit pattern at 810. The first bit in the storage string may be selected and then a matching bit in the biometric data may be identified. Next, the position is determined (as shown at 830 in panel B, 820A-C represent the reference landmarks). The next bit in the storage string is selected and a matching position in the biometric string is found. This process may be continued until the contents of the biometric string have been exhausted. The position encoded result is shown in panel B 830. This type of storage may impose a repetition code, which makes the stored data robust to corruption of the biometric data in a local area. The error correction may allow retrieval if for example 15% of the biometric sensor data was corrupted/damaged. As biometrics can change over time, the error correction may provide some robustness over time to allow retrieval even if the biometric changes.

In some example embodiments, sensitive data such as cryptographic keys may be stored in biometric data. The following provides additional description related to the storage of biometric data in data comprising cryptographic keys.

In the case of some biometric authentication protocols, a cryptographic key may be stored on the device, such as a smart phone or a cell phone (or storage mechanism therein). When the user's measured biometric matches a stored biometric signature (which may also be stored on the same device as the cryptographic key), the device may release the cryptographic key. However, storing both the cryptographic key and the stored biometric signature (which serves as a reference for the comparison) may comprise security.

In some example embodiments, machine learning may be used to determine the structure of biometric data, such as a biometric signature. However, the machine learning may not be used to recognize biometric data. For example, bit patterns, such as sensitive data, may be stored in biometric data using biometric features, in accordance with some example embodiments. This may allow the storage of sensitive data in encoded manner, so the sensitive data is encoded based on the biometric data obtained from the user. Moreover, machine learning may be used to detect these biometric features. Machine learning may provide some robustness with respect to small changes in the biometric data. Moreover, the machine learning techniques may be deployed using relatively, low powered integrated circuits, so deployment on power constrained or battery operated user equipment, such as wearable, may be realized.

The biometric data may represent an image, although it may take other forms as well including a vector or other bit string. Moreover, the biometric data may include some structure to enable feature detection as described above with respect to 306, for example. A feature may be referred to as a distinct, small subset of the image/data vector corresponding to the biometric sensor data.

To use a sensor as a biometric sensor at 108, biometric data generated by the sensor may be analyzed to determine the quantity of distinct features that may be present and how many distinct features may be present in a current set of biometric data. This may determine the capacity of the biometric data. For a quantity of NF distinct features, $LF=\log_2(NF)$ bits may be encoded by one feature. A feature may have a certain dimension (for example, length for vector data). The feature size may need to be much smaller than the total data size.

Two tasks may be needed, namely bit string storage and bit string retrieval. Examples of the maps are shown at FIGS. 9 and 10 below.

Before storage or retrieval of a bit string of for example sensitive data, pre-processing may be performed. For example, the biometric data may be aligned as described above. Specifically, it is very likely that biometric data measured at different times may not perfectly align. As the processes disclosed herein may use the position of features within the biometric data as a way to encode sensitive information for storage, the biometric data may need to be aligned prior to further feature processing. To provide alignment, certain features may be used as alignment marks. The alignment marks (for example, reference landmarks to enable alignment) may be stored at the user equipment or apparatus 100. However, the areas in the biometric data that are used as alignment marks may not be used for bit string storage as shown at for example 820A-C above.

In some example embodiments, the biometric data may also undergo additional pre-processing, such as de-noising, subtraction of background noise, contrast equalization, and/or the like.

After the pre-processing including alignment, a bit string of for example sensitive data may be stored in accordance with some example embodiments. For example, given an aligned biometric data, a bit string b=(000000111001) of length NB, a quantity of features NF, and a bit length LF per feature for example, the bit string may be processed as follows:

1. The bit string b may be divided into units of length $L_F$, such that b=(000,000,111,001).
2. For each substring, a corresponding feature is identified in the biometric data as shown in FIG. 9 and its location is recorded.
3. The output of the storage process may include a list of positions, $p=(x_1, x_2, \ldots, x_{NX})$ of length $N_X=N_B/L_F$.

Figure 9:
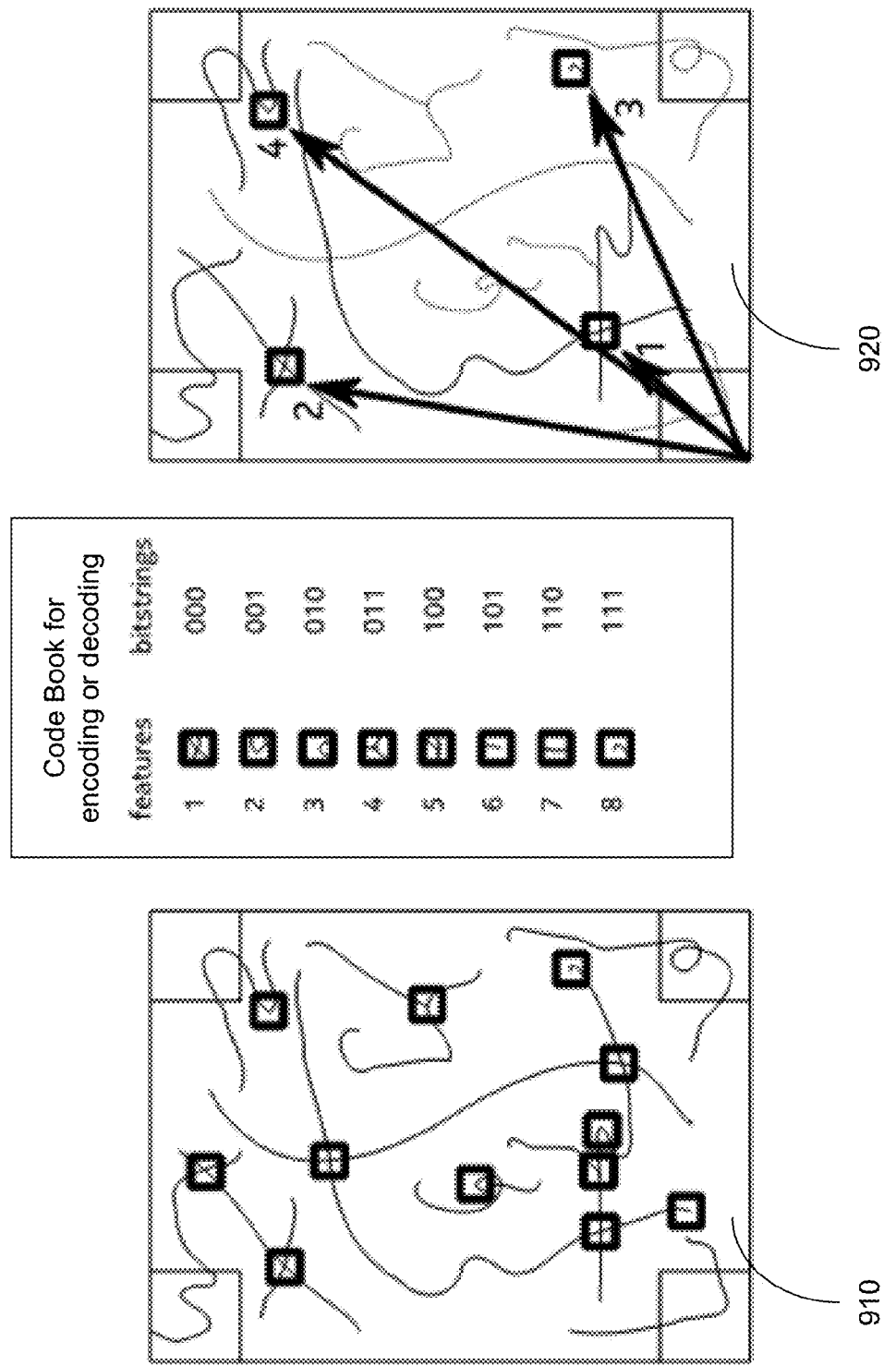
FIG. 9 depicts an example of the encoding process, in accordance with some example embodiments
Figure 10:
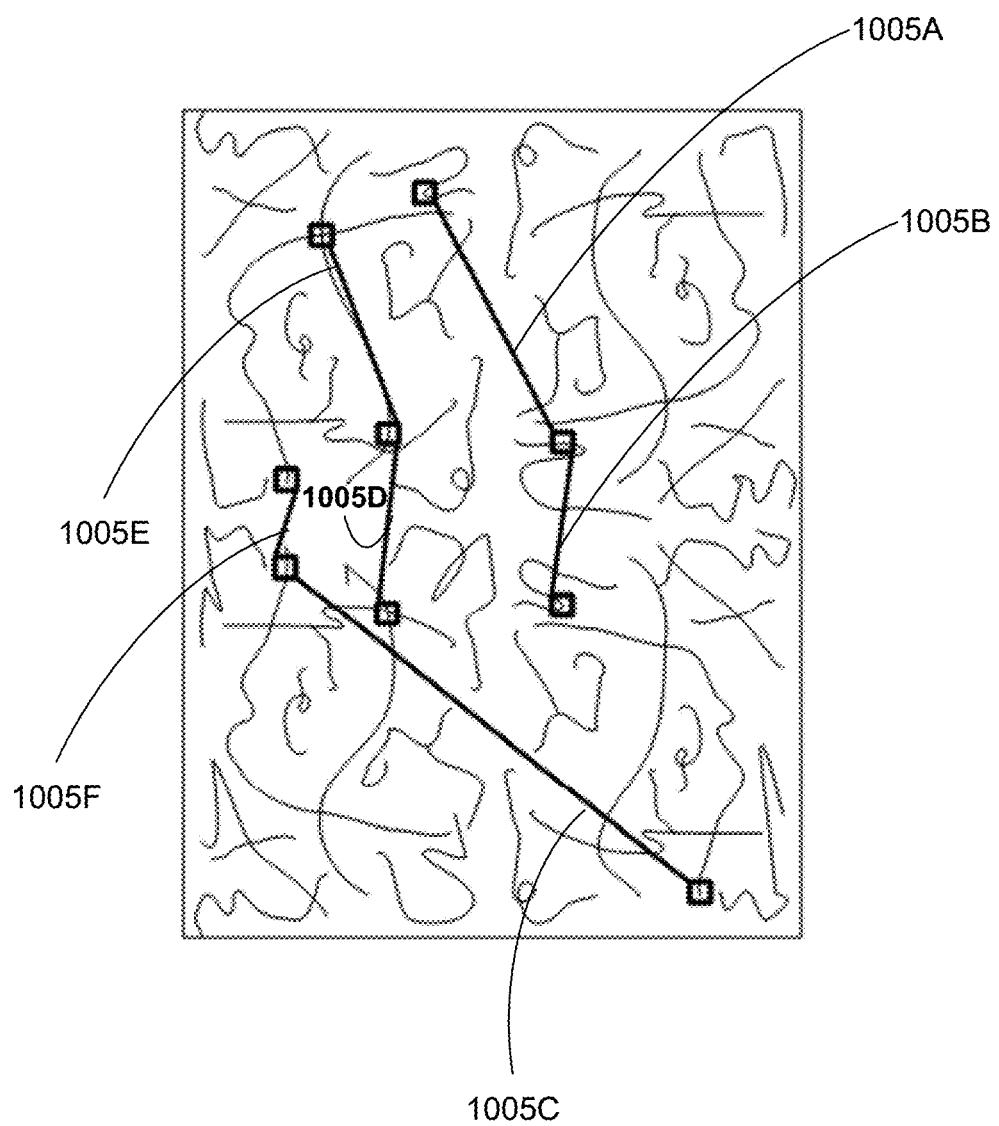
FIG. 10 shows an example implementation of an error correction code, in accordance with some example embodiments.

FIG. 9 depicts an example of the encoding process, in accordance with some example embodiments. At 910, an example of an image corresponding to biometric data, such as scan of a finger is shown, although other types of biometric data may be used as well. In this example, 8 features may be selected (labeled with a square). As such, the feature locations may be used to encode 3 bits ($\log_2 8=3$ bits). To illustrate, an example bit string b may correspond to (000000111001), which is then divided in sequences of 3 bits, so b corresponds to sensitive data comprising (000, 000, 111, 001). In this example, each of the 3 bits in the string b (000,000,111,001) are encoded using a position of the features within the biometric data. For example, 000 maps to the position of feature 1 at $X_1$ at 920, 000 maps to the position of feature 1 at $X_2$ at 920, 111 maps to the position of feature 8 at $X_3$ at 920, and 001 maps to the position of feature 2 at $X_4$ at 920. Thus, the bit string b is translated into a list of possible positions $p=(x_1, x_2, x_3, x_4)$ as shown at 920.

Bit String Retrieval

The following describes an example of retrieving the bit string. Given aligned biometric data, a location vector $p=(x_1, x_2, \ldots, x_{NX})$, a quantity of features $N_F$, and a bit length $L_F$ per feature, processing may include the following:

1. For each location, partial data may be extracted from the biometric data;
2. For each partial data, a feature recognition process may be performed and, based on the classification provided by the recognition process, the corresponding bit sequence may be assigned; and
3. The short bit sequences may be combined to give total bit string b.

Bit String Storage with Repetition Code Error Correction

The following describes an example of storing a bit string with error correction, such as a repetition code error correction (although other types of error correction may be use as well). Given aligned biometric data, a bit string b=(000000111001) of length $N_B$, a number of features $N_F$, and a bit length LF per feature for example, processing may include the following:

1. The bit string b may be divided into units of length $L_F$, such that b=(000,000,111,001).

2. For each substring, a number $N_E$ of corresponding features may be identified in the biometric data (see FIG. 10) and their location may be recorded.
3. The output of the storage algorithm may be a list of groups of positions $p=((x_{11}, x_{12}, \ldots, x_{1NE}), (x_{21}, x_{22}, \ldots, x_{2NE}), \ldots, (x_{NX1}, x_{NX2}, \ldots, x_{NXNE}))$ of length $N_E N_X = N_E N_B / L_F$.

FIG. 10 shows an example implementation of the of error correction code, in accordance with some example embodiments. The thick lines 1005A-F connect groups of features for error correction purposes. A voting scheme, such as a majority vote, may be applied to determine the dominant feature in a group.

Bit String Retrieval with Repetition Code Error Correction

The following describes an example of bit string retrieval with error correction, such as a repetition code error correction. Given aligned biometric data, a location vector $p=((x_{11}, x_{12}, \ldots, x_{1NE}), (x_{21}, x_{22}, \ldots, x_{2NE}), \ldots, (x_{NX1}, x_{NX2}, \ldots, x_{NXNE}))$, a quantity of features $N_F$, and a bit length $L_F$ per feature for example, processing may include the following:
1. For each location, partial data may be extracted from the biometric data;
2. For each partial data, a feature recognition process may be performed and based on classification provided by the recognition process, the corresponding bit sequence may be assigned;
3. For each group of locations, the corresponding short bit sequences may be subjected to majority voting; and
4. The majority short bit sequences may be combined to give the bit string.

Figure 11:
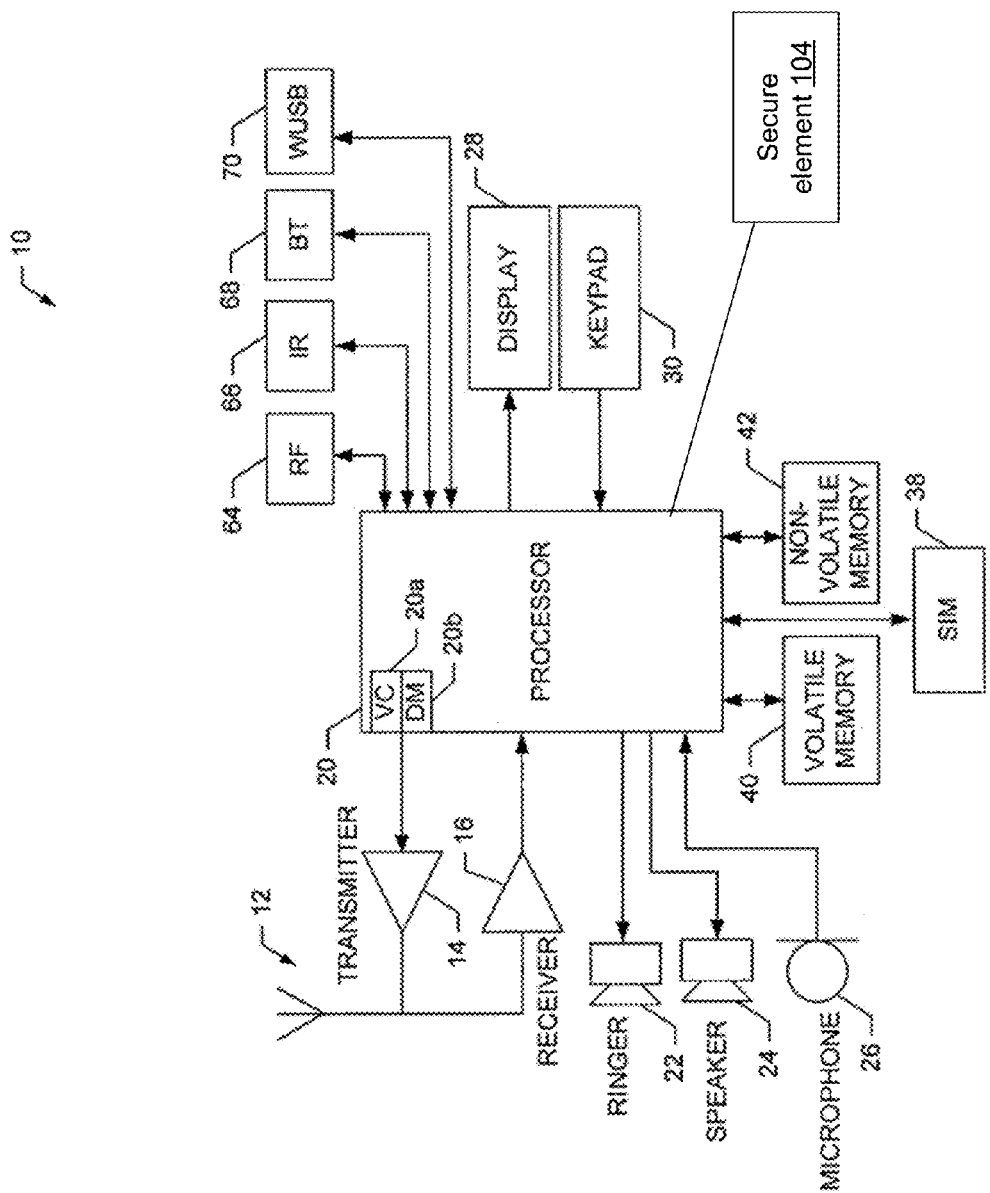
FIG. 11 depicts an example apparatus including a secure element, in accordance with some example embodiments.

FIG. 11 depicts a block diagram of an apparatus 10, in accordance with some example embodiments. The apparatus may comprise user equipment, such as a wearable device, a cell phone, a smart phone, a table, and/or any other type of processor-based device including storage devices. In some example embodiments, the apparatus may include a secure element 104 or other type of storage element that can be store and retrieve data as disclosed herein. Moreover, the apparatus may include, or be coupled to, a biometric sensor.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 10 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or any subsequent revisions or improvements to these standards. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, LTE-Direct, LTE-Unlicensed, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. For example, the PND may provide voice commands to enable voice-guided navigation. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 10, apparatus 10 may also include one or more mechanisms for sharing and/or obtaining data. The apparatus 10 may also include for example short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a Near Field Communication (NFC) transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), a eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus to provide the operations disclosed herein including process 200, 300, and/or the like. The memories may comprise an identifier, such as an international mobile equipment identification (IMEI) code, capable of uniquely identifying apparatus 10. The functions may include the operations disclosed herein including receiving, at a user equipment, biometric data from a user of the user equipment; receiving, at the user equipment, sensitive data to be encoded and/or decoded; encoding, based on at least one feature detected in the biometric data, the sensitive data, when the user equipment is in a storage mode; decoding, based on at least the at least one feature detected in the biometric data, the sensitive data, when the user equipment is in a read mode, and/or any other operations as disclosed herein.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 10, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing herein, a technical effect of one or more of the example embodiments disclosed herein may include enabling the use of biometric data as an authenticator while providing security and a reduced risk of comprising a user' biometric information.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

The different functions discussed herein may be performed in a different order and/or concurrently with each other. Furthermore, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments of the invention, these descriptions should not be viewed in a limiting sense. Rather, there are several variations and modifications, which may be made without departing from the scope of the present invention as, defined in the appended claims. The term "based on" includes "based on at least."

What is claimed:

1. A method comprising:
    receiving, at a user equipment, biometric data from a user of the user equipment;
    receiving, at the user equipment, sensitive data to be encoded and/or decoded;
    encoding, based on a position of at least one feature detected within the biometric data, the sensitive data, when the user equipment is in a storage mode configured to encode the sensitive data for storage; and
    decoding, based on the position of the at least one feature detected within the biometric data, the sensitive data, when the user equipment is in a read mode configured to decode the sensitive data encoded for storage, wherein the encoding and the decoding are based on a codebook including position information for the at least one feature detected within the biometric data, the position information including the position.

2. The method of claim 1, wherein the encoding further comprises:
    mapping a portion of the sensitive data to the position; and
    storing, as an encoded representation of the portion of the sensitive data, the position and a location of the portion in the sensitive data.

3. The method of claim 2, wherein a repetitive error correction code is applied before the storing.

4. The method of claim 1, wherein the encoding further comprises:
    mapping another portion of the sensitive data to another position of another feature in the biometric data; and
    storing, as an encoded representation of the other portion of the sensitive data, the other position and another location of the other portion in the sensitive data.

5. The method of claim 2, wherein the storing comprises storing in secure storage.

6. The method of claim 1, wherein the at least one feature is selected from among a plurality of features detected within the biometric data.

7. The method of claim 6, wherein the at least one feature is selected at random from among the plurality of features.

8. The method of claim 1, wherein the biometric data is measured by at least one of an optical coherence tomography sensor, an optical sensor array, an infrared sensor array, a flexible optical sensor array, a retinal scanner, a fingerprint scanner, a vein scanner, a camera providing facial images, and/or a microphone providing a voice pattern.

9. The method of claim 1, further comprising:
    identifying the at least one feature within the received biometric data.

10. The method of claim 1, further comprising:
    pre-processing the received biometric data by at least finding a reference landmark in the received biometric data to enable an alignment of the received biometric data.

11. The method of claim 1, wherein the sensitive data undergoes an exclusive OR operation with a unique device string prior to the encoding.

12. The method of claim 1, wherein the sensitive data undergoes error correction coding prior to the encoding.

13. The method of claim 1, wherein the decoding further comprises:
    decoding the position of the at least one feature into the sensitive data.

14. The method of claim 1, wherein the decoding further comprises:
    retrieving, from storage, the position of the at least one feature;
    mapping the position to a portion of the sensitive data; and
    providing the sensitive data as a decoded output.

15. The method of claim 14, wherein the storage comprises secure storage.

16. The method of claim 14, wherein a repetitive error correction code is applied to the decoded output.

17. The method of claim 14, wherein the decoded output undergoes an exclusive OR operation with a unique device string.

18. The method of claim 14, wherein the decoded output undergoes error correction.

19. The method of claim 1, wherein the biometric data is combined with other biometric data and/or physiological data.

* * * * *